No. 679,156. Patented July 23, 1901.
S. E. & W. W. MORRAL.
MACHINE FOR CUTTING GREEN CORN FROM THE COB.
(Application filed July 21, 1899.)
(No Model.) 3 Sheets—Sheet 1.
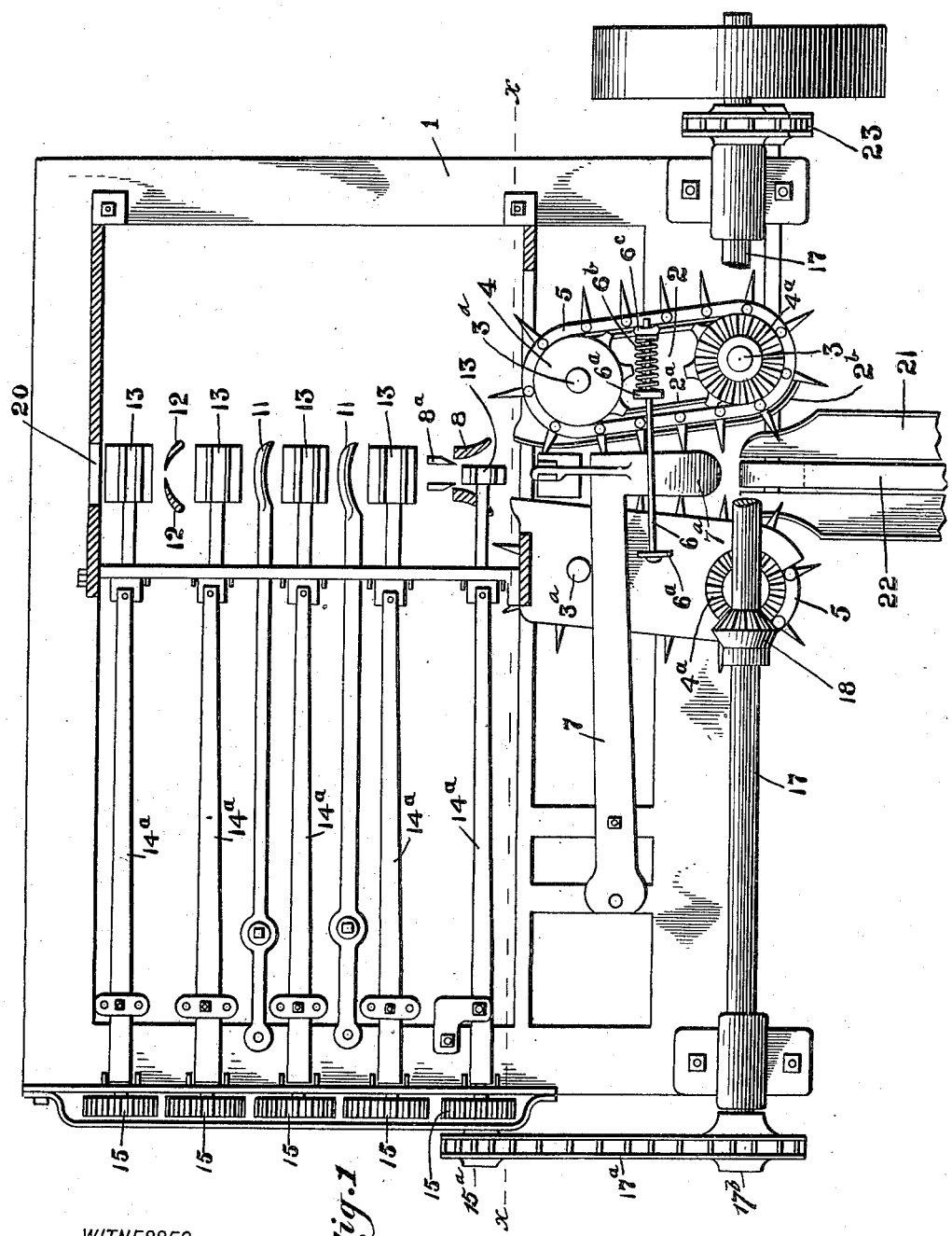
WITNESSES:
INVENTORS:
Samuel E. Morral and
William W. Morral,
BY
Finckel & Finckel,
ATTORNEYS.

No. 679,156.  
Patented July 23, 1901.  
S. E. & W. W. MORRAL.  
MACHINE FOR CUTTING GREEN CORN FROM THE COB.  
(Application filed July 21, 1899.)  
(No Model.)  
3 Sheets—Sheet 2.
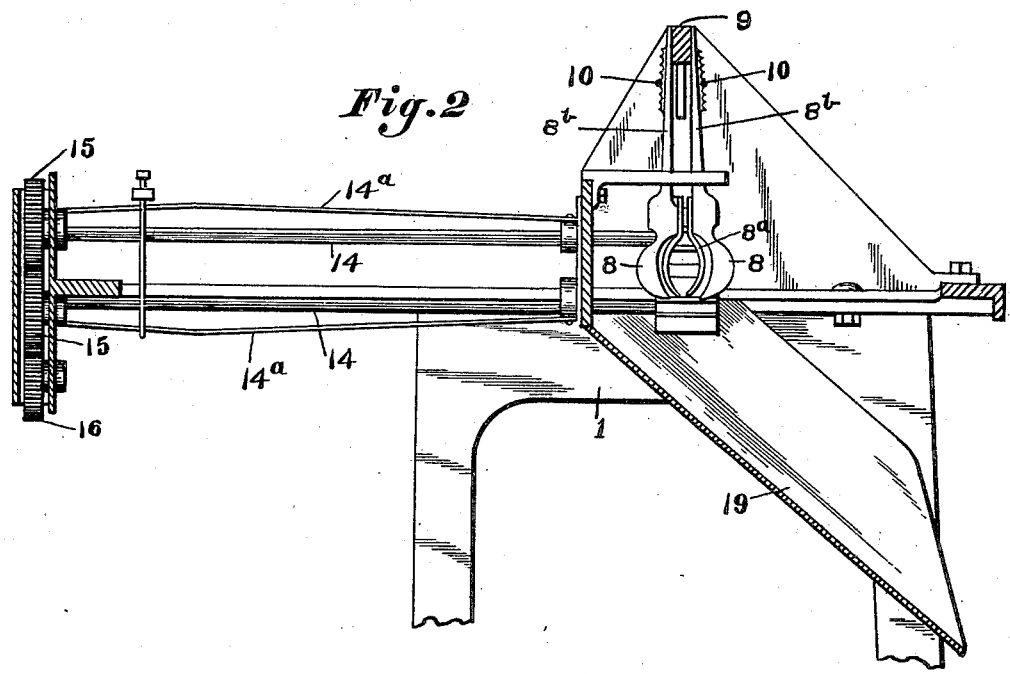
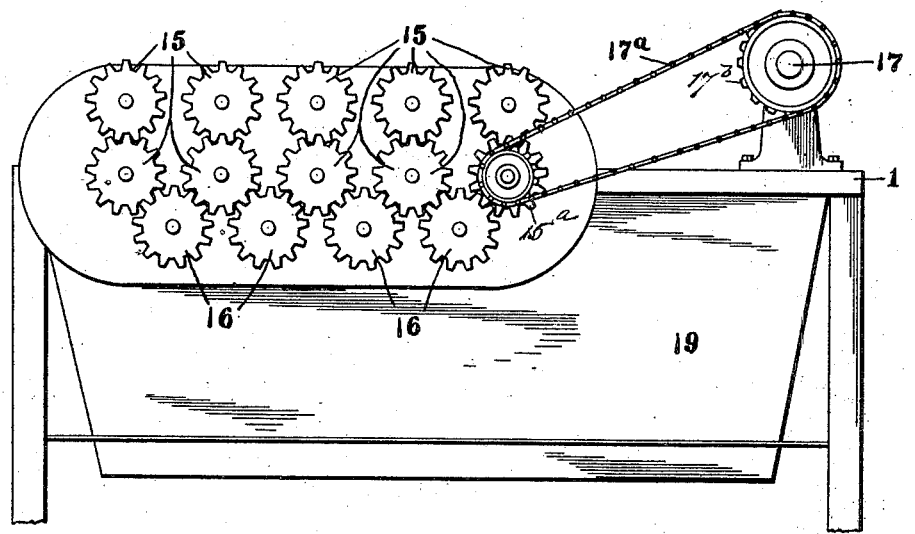

No. 679,156. Patented July 23, 1901.
S. E. & W. W. MORRAL.
MACHINE FOR CUTTING GREEN CORN FROM THE COB.
(Application filed July 21, 1899.)
(No Model.) 3 Sheets—Sheet 3.
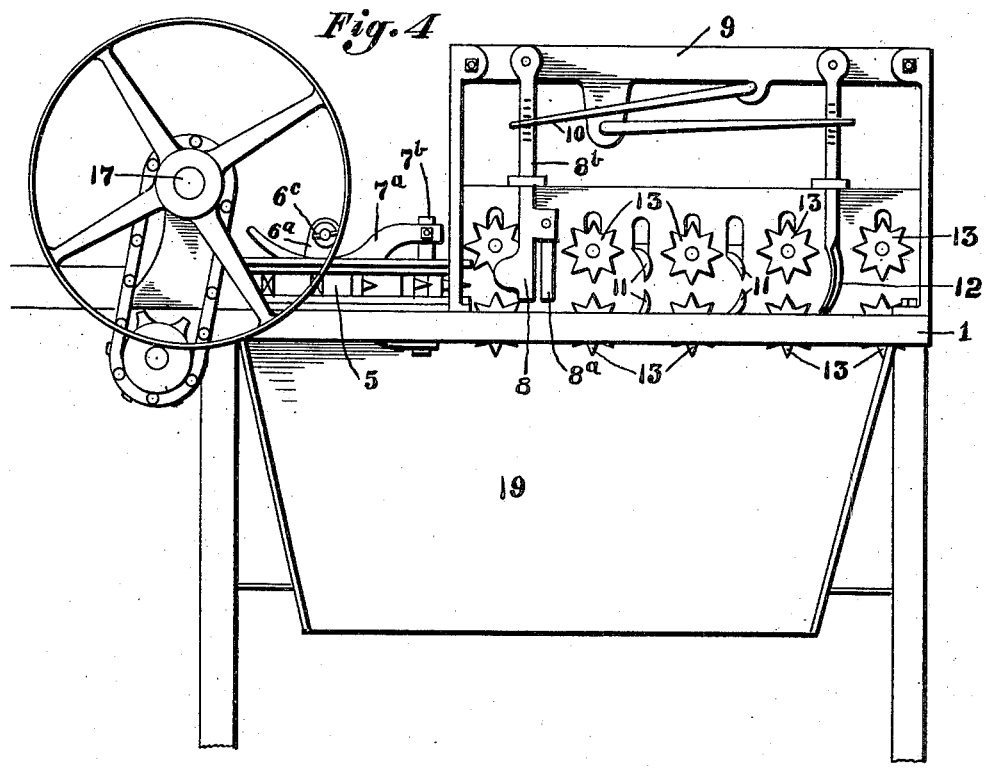
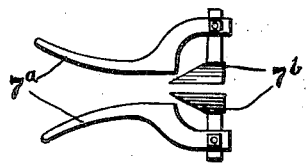
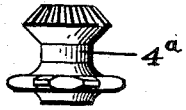
WITNESSES: INVENTORS:
Samuel E. Morral and
William W. Morral,
BY
Finckel & Finckel,
ATTORNEYS.

UNITED STATES PATENT OFFICE.

SAMUEL E. MORRAL AND WILLIAM W. MORRAL, OF MORRAL, OHIO.

MACHINE FOR CUTTING GREEN CORN FROM THE COB.

SPECIFICATION forming part of Letters Patent No. 679,156, dated July 23, 1901.

Application filed July 21, 1899. Serial No. 724,631. (No model.)

*To all whom it may concern:*

Be it known that we, SAMUEL E. MORRAL and WILLIAM W. MORRAL, citizens of the United States, residing at Morral, in the county of Marion and State of Ohio, have invented certain new and useful Improvements in Machines for Cutting Green Corn from the Cob; and we do hereby declare the following to be a full, clear, and exact description of the invention, such as will enable others skilled in the art to which it appertains to make and use the same.

Our present invention consists of improvements upon the machine shown in the patent granted to us February 5, 1895, No. 533,723, and in the patent granted to W. Sprague March 4, 1890, No. 422,650.

Our experience has demonstrated that the long endless feed-chains, designated 10 in the patent granted to us, are somewhat expensive and difficult to operate and liable to get out of order and that the knives $h$ of the feed-rollers C and C' of the Sprague patent mutilate the kernels of the corn. Our aim is primarily to combine a portion of the features of the two machines so as to overcome the objections found in each; and our invention consists of the construction and combination of parts herein described, and pointed out in the claims.

In the annexed drawings, showing an embodiment of our present improvements, Figure 1 is a plan view with a portion of the main driving-shaft broken away and parts removed to illustrate details. Fig. 2 is a transverse vertical sectional view taken on a plane indicated by line $x\,x$, Fig. 1, looking toward the rear of the machine. Fig. 3 is a side elevational view of the left-hand side of the machine as seen in Fig. 1, the guard for the gearing being omitted. Fig. 4 is a similar view looking at the right-hand side of the machine. Fig. 5 is a side view of what are called the "first" or "front" cutters and guides, and Fig. 6 is a detail view illustrating a combined miter-gear and sprocket employed in the machine.

Like characters of reference in the several views designate corresponding parts.

1 designates the main supporting-frame, provided with suitable legs to sustain the horizontal part at the proper elevation above the floor. In the front part of the frame and nearer the right-hand side thereof are two plates 2, arranged in the same horizontal plane and pivoted at their front ends on vertical stationary stud-shafts 3. These plates 2 are shown to be formed with upwardly-projecting bosses $2^a$ and along their edges with an upwardly-projecting flange $2^b$, so that when a superposed covering-plate is put on the bosses $2^a$ shall serve as supports and the flange $2^b$ shall serve as a guide for the teeth of the feed-chain, the flange $2^b$ being of smaller depth than the bosses $2^a$. The plate 2 is also formed at its rear end with a stationary stud-shaft $3^a$ for the reception of a sprocket-wheel 4, while a combined sprocket and bevel gear-wheel $4^a$ (see Fig. 6) is placed on each of the shafts 3, on which the plates 2 are pivoted. A toothed chain 5 is placed on each of the plates to run about the sprockets 4 and $4^a$, power being applied to the miter portion of the wheel $4^a$, as hereinafter explained. The two chain-carrying plates 2 are elastically connected by means of a bolt 6 passing through upwardly-projecting studs $6^a$ on the plates, a coil-spring $6^b$ being placed on one projecting end between a stud $6^a$ and a washer and thumb-nut $6^c$. By turning the nut $6^c$ the tension of the spring may be regulated to increase or diminish the force with which the plates and their contained toothed chains are drawn toward each other, and so determine the degree of penetration of the teeth of the wheel. By this arrangement also the opening between the toothed chains automatically adapts itself to varying size of ears.

Supported on spring-arms 7, attached to the upper and lower sides of the horizontal portion of the frame, are guides $7^a$ and horizontal cutters $7^b$. These guides and cutters are arranged between the toothed feed belts or chains 5, and just in rear of these horizontal guides and cutters are vertically-arranged guides and cutters 8 and $8^a$, respectively. These vertical guides and cutters are formed upon or attached to an arm $8^b$, loosely attached to opposite sides of a supplementary frame 9, secured to the main frame above the path of movement of the ear, and said guides and cutters are yieldingly held toward each other by means of springs 10, pivoted in the frame 9 and pressing upon arm 8$^b$. These springs have adjustable contact with arms 8$^b$ to vary the effect of the spring. In rear of the vertical guides and cutters are shown two pairs of horizontally-arranged scrapers 11, and beyond these is a pair of vertical scrapers 12. The horizontal scrapers 11, as well as the vertical scrapers 12, have means for holding them yieldingly toward each other. The vertical scrapers preferably have springs like that designated 10.

Arranged between the several cutters and scrapers are pairs of toothed feed-wheels 13, keyed on the inner ends of shafts 14. The outer ends of these shafts 14, which project beyond the side of the frame, are provided with spur-gears 15, meshing in pairs, and between these meshing pairs of gears are journaled spur-gears 16, meshing with the lower members of the adjacent pairs 15, so that motion imparted to one of said gears—for example, as shown, the lower one of the forward pair 15—may be communicated to all the rest and a contrary motion to the upper and lower members of the pairs of feeding-wheels. The inner ends of the shafts 14, bearing the feed-wheels 13, work in slotted bearings, and said shafts are acted on by springs 14$^a$, holding said wheels yieldingly toward each other.

Arranged across the front of the machine is a drive-shaft 17, upon which are beveled pinions 18, engaging the miter-gear portions of the sprockets 4$^a$ to move the adjacent sides of the toothed feed chain or belt inward, and on the left-hand end of said shaft (see Fig. 1) is a sprocket 17$^b$, from which passes a chain 17$^a$ to a sprocket 15$^a$ on the shaft of the lower member of the forward pair of gears 15.

An inclined trough 19 is arranged under the cutters and scrapers to guide the cut kernels and scrapings to a suitable receptacle at the side of the machine, and an opening 20 is provided in the machine beyond the rear pair of feed-wheels, through which the cobs are ejected.

21 designates the ear-feeding trough, in the bottom of which runs the upper part of an endless belt 22, upon which the ears are placed to be fed into the machine, and this belt may be driven by a sprocket-chain 23 from the shaft 17. When the ears leave the feed-belt 22, they are taken by the pins of the feed-chain 5 (which may penetrate deeply and take a firm hold of the ear without seriously mutilating the kernels) and carried through the first cutters 7$^b$, which removes the larger portion of the corn from the cob. The little corn that remains on the sides of the ear after the first cutting is easily removed by the second pair of vertical cutters 8$^a$, after which the cob is fed by feed-wheels 13 through the horizontal and vertical scrapers, which strip the cob of the fragments of kernels remaining.

In cutting green corn from the cob the first cutting is the most difficult, and the advantage of employing a toothed chain to carry the ear through the first cutter and then using more easily propelled apparatus to remove the remnants will be obvious in that it effects economy in the cost of construction and operation.

The employment of spur-gears 15 and 16 instead of bevel-gears, as heretofore, is advantageous in that they are cheaper, are more easily kept in line, and run more truly than the bevel-gears.

What we claim, and desire to secure by Letters Patent, is—

1. In a machine for cutting green corn from the cob, the combination of two plates or frames 2 capable of movement with respect to each other, means for yieldingly holding said plates toward each other, sprocket-wheels in said plates, toothed feed belts or chains around the sprockets, gear-wheels 4 4$^a$ on shafts of said sprockets, cutters 7$^b$ located near the rear end of the feed-chains, driving-shaft 17 having gears or pinions 18 18 meshing with gears 4$^a$ 4$^a$, and also having sprocket 17$^b$, feed-wheel shafts 14 arranged in pairs having spur-gears 15 meshing in pairs, spur-gears 16 intermediate of and meshing with a member of each adjacent pair 15, a sprocket-wheel 15$^a$ connected with one of said spur-gears, and a belt or chain connecting said sprockets 15$^a$ and 17$^b$, substantially as shown and described.

2. In a machine for cutting green corn from the cob, the combination of two plates or frames 2 capable of movement with respect to each other, means for yieldingly holding said plates toward each other, sprocket-wheels in said plates, toothed feed belts or chains about the sprockets, gear-wheels 4$^a$ 4$^a$ on shafts of said sprockets, spring-arms 7, cutters 7$^b$ located near the rear end of the feed-chains, driving-shaft 17 having gears or pinions 18 18 meshing with gears 4$^a$ 4$^a$, and also having sprocket 17$^b$, feed-wheel shafts 14 arranged in pairs having spur-gears 15 meshing in pairs, spur-gears intermediate of and meshing with a member of each adjacent pair 15, a sprocket-wheel 15$^a$ connected with one of said spur-gears, and a belt or chain connecting said sprockets 15$^a$ and 17$^b$, substantially as shown and described.

3. In a machine for cutting green corn from the cob, the combination of toothed feed-chains and guides and cutters between them, and a series of yielding feed-wheels driven by spur-gears with cutters and scrapers between them arranged beyond and in rear of the feed-belts, one pair of scrapers arranged horizontally and another vertically with respect to the machine.

4. In a machine for cutting green corn from the cob the combination of yielding cutters 7$^b$, toothed feed-belts 5 yielding at their rear or inner ends only, and a series of yielding feed-wheels with cutters and scrapers between them arranged beyond the feed-belts, one pair of scrapers arranged horizontally and another pair vertically of the machine, said cutters and scrapers mounted upon shafts controlled by springs, substantially as described.

5. In a machine for cutting green corn from the cob, the combination of the feed-belts 5 yielding at their inner or rear ends, and yielding guides 7ª and cutters 7ᵇ arranged between said belts, and feed-wheels 13 in rear of the belts with cutters and scrapers arranged between said feed-wheels, one pair of scrapers arranged vertically and another pair arranged horizontally of the machine, said cutters and scrapers mounted upon shafts controlled by springs.

6. In a machine for cutting green corn from the cob, the combination of plates 2, pivots or shafts 3 on which said plates are supported, sprocketed gear-wheels also on said pivots or shafts, and toothed feed-belts yieldingly separable at their rear ends only mounted on said plates 2 and driven by said sprocketed gear-wheels 4ª, and a series of feed-wheels with cutters and scrapers in pairs interposed therebetween arranged beyond the feed-belts, one pair of scrapers being disposed horizontally and the other pair vertically with respect to the machine, said cutters and scrapers mounted upon shafts controlled by springs, substantially as described.

7. In a machine for cutting green corn from the cob, the combination with a plurality of toothed feed-chains actuated by sprocket-wheels, said chains being automatically adjustable, and provided with guard-plates and guides therefor, of guides and cutters for the corn located between said chains and a series of yielding feed-wheels with cutters and scrapers between them arranged beyond and in the rear of said feed-chains.

In testimony whereof we affix our signatures in presence of the same two witnesses.

SAMUEL E. MORRAL.
WILLIAM W. MORRAL.

Witnesses:
H. E. WASHBURN,
C. J. SCHULTZ.